United States Patent
Champion et al.

(10) Patent No.: US 10,425,362 B2
(45) Date of Patent: Sep. 24, 2019

(54) WIRELESS COMMUNICATION SYSTEM WITH MACRO DIVERSITY

(71) Applicant: Semtech Corporation, Camarillo, CA (US)

(72) Inventors: Ludovic Champion, Grenoble (FR); Olivier Bernard André Seller, Sainte Soulle (FR)

(73) Assignee: Semtech Corporation, Camarillo, CA (US)

(*) Notice: Subject to any disclaimer, the term of this patent is extended or adjusted under 35 U.S.C. 154(b) by 91 days.

(21) Appl. No.: 15/594,227

(22) Filed: May 12, 2017

(65) Prior Publication Data

US 2017/0339073 A1    Nov. 23, 2017

(30) Foreign Application Priority Data

May 20, 2016 (EP) ..................... 16170602

(51) Int. Cl.
| | |
|---|---|
| H04L 12/939 | (2013.01) |
| H04L 5/00 | (2006.01) |
| H04L 29/06 | (2006.01) |
| H04B 1/69 | (2011.01) |
| H04L 1/02 | (2006.01) |
| H04L 1/00 | (2006.01) |
| H04W 4/70 | (2018.01) |
| H04L 27/10 | (2006.01) |
| H04L 27/00 | (2006.01) |

(52) U.S. Cl.
CPC ............ *H04L 49/555* (2013.01); *H04B 1/69* (2013.01); *H04L 1/0045* (2013.01); *H04L 1/0061* (2013.01); *H04L 1/02* (2013.01); *H04L 5/0062* (2013.01); *H04L 69/22* (2013.01); *H04B 2001/6912* (2013.01); *H04L 27/103* (2013.01); *H04L 2001/0093* (2013.01); *H04L 2027/0026* (2013.01); *H04W 4/70* (2018.02)

(58) Field of Classification Search
None
See application file for complete search history.

(56) References Cited

U.S. PATENT DOCUMENTS

| | | | | |
|---|---|---|---|---|
| 7,308,043 | B1* | 12/2007 | Frank | H04K 1/003 342/132 |
| 2006/0068804 | A1* | 3/2006 | Matusz | H04L 1/0061 455/452.2 |
| 2014/0225762 | A1* | 8/2014 | Seller | G01S 13/84 342/47 |

FOREIGN PATENT DOCUMENTS

| | | |
|---|---|---|
| EP | 2449690 A | 5/2012 |
| EP | 2767847 A1 | 8/2014 |
| WO | WO-2011/000936 A1 | 1/2011 |

* cited by examiner

*Primary Examiner* — Yaotang Wang
(74) *Attorney, Agent, or Firm* — Blank Rome LLP

(57) ABSTRACT

A wireless communication system, comprising one or several nodes (A) equipped by a wireless radio interface that is adapted for transmitting digital messages modulated in the form of a series of frequency chirps, for example, LoRa-modulated radio signals. The message is received simultaneously by several base stations (C, D, E), and a server (S) is arranged for dividing the frames by the diverse stations and recombining a corrected frame for the intended recipient (B) based on error codes. Advantageously, the base stations being adapt their timing error compensation strategy when the error codes indicate a corruption of the message.

11 Claims, 3 Drawing Sheets

WIRELESS COMMUNICATION SYSTEM WITH MACRO DIVERSITY

REFERENCE DATA

This patent application claims priority of European Patent Application EP16170602.3 filed on May 20, 2016 in the name of Semtech Corporation, the contents whereof are hereby incorporated by reference.

FIELD OF THE INVENTION

The present invention relates, in embodiments, with wireless network systems and in particular with wireless networks comprising a plurality of low-power nodes, and is concerned with the reduction of communication errors and rejection of interferences.

BACKGROUND

Network connected devices have been the object of considerable interest and effort in recent times. Improvements in wireless communication techniques are leading to the creation of an "Internet of Things".

Several wireless communication protocols have been proposed in this context. The LoRa communication system, known among others by patent applications EP2767847 and EP2449690, uses Chirp spread-spectrum modulation to achieve long transmission ranges with low power consumption and complexity.

It is also known to use diversity techniques to extract information from a noisy communication channel. Antenna diversity, Site diversity, and Frequency diversity, for example, foresees the use of several physical antennas, location or frequency bands to receive the same message. Several demodulation techniques have been devised to reconstruct a message from corrupted signals.

Wireless communication in IoT system are often deployed over license-free ISM bands. This means that message exchanges must contend with interfering signals from other devices using the same frequencies at the same time.

A same system may need to transmit over different interfering channels. The LoRa modulation system, for example allows simultaneous transmission at different spreading factors. Overlapping signals with different spreading factors can be independently modulated, but they do interfere with one another. Some variants of the LoRa modulation system also foresee transmission of FSK modulated data at the same time as chirp-modulated signals, and these signals can interfere as well.

Conventionally, transmission errors are dealt with by causing the retransmission of the corrupted message or part of it. In Automatic Repeat Request (ARQ) systems, the receiver verifies whether a received frame has been received correctly by using some embedded error-correction data, for example a CRC code. If the verification fails, a retransmission request is sent back to the transmitter. In other cases, the receiver would send an acknowledgement for any correctly received frame, missing which the frame will be retransmitted automatically.

The disadvantage of these schemes is that they represent an overhead on the network capacity, and the volume of exchanged data increases rapidly with the number of interferences. In some cases, the rate of error due to interference may approach 50%. In such situations, retransmission requests and repetition of previous frames may consume most of the network capacity. The requests, acknowledgments, and retransmissions may also be felt as interferences by other networks competing for the same frequencies, which will cause an increase of signalling in those networks as well, and may lead to an escalation of interference.

More advanced schemes, loosely termed "Hybrid ARQ" foresee the retransmission of a subset of the lost frame, or the retransmission of a different version of redundancy. Such measures also require active signal from the receiver and, while they mitigate the above limitations, cannot solve them completely.

In IoT network, the above strategy may prove inadequate because usually the duty-cycle of the base station is limited. Therefore, the preferred way to handle frame errors is to apply redundancy systematically: each frame is sent several times, possibly over different frequencies. This has of course a negative impact on battery life, network capacity, and interference into other networks.

SHORT DESCRIPTION OF THE INVENTION

The present invention reconstructs messages received from a plurality of distinct wireless-interconnected nodes.

In the case of spread-spectrum systems, like LoRa, the interferers are often shorter in time than the transmission frames.

The network of the invention operates with a high frequency reuse factor and is often deployed as a single-frequency network. Any transmission destined to a specific recipient will be picked up by several others, possibly all, nodes within reception range. Thanks to this redundancy, nodes can cooperate to recover a frame that none of them has received correctly.

EMBODIMENT(S)

Figure 1:
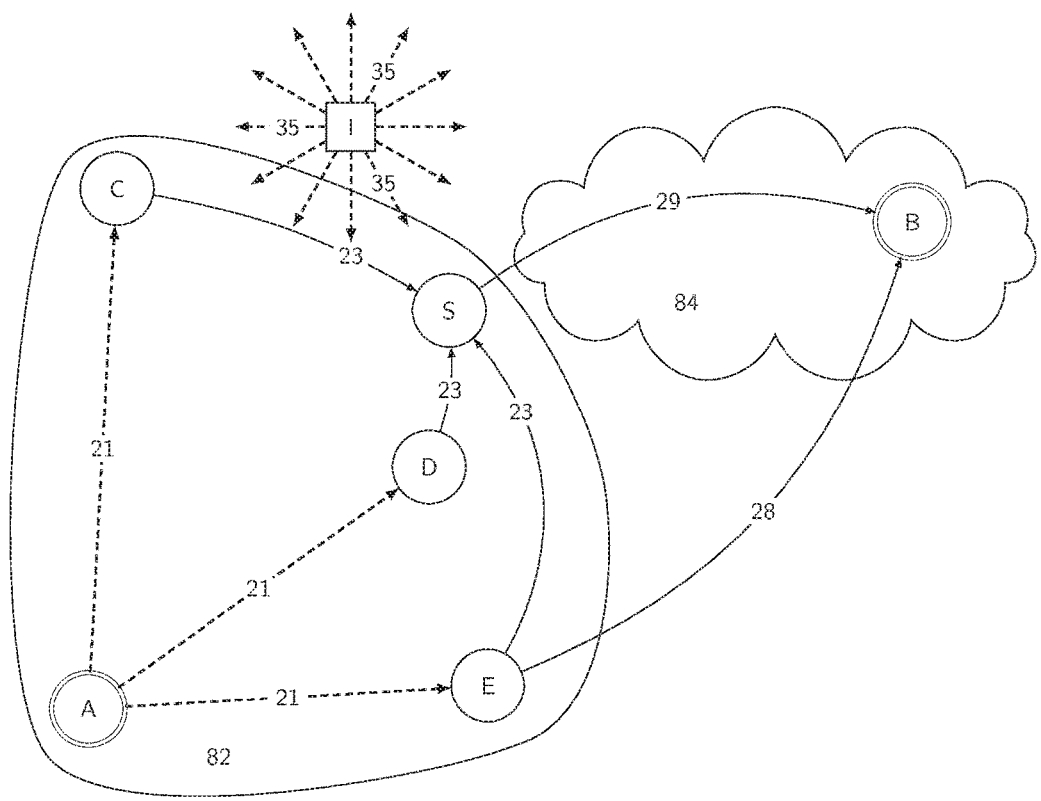
FIG. 1 represents the transmission of a message between two nodes, and its recovery assisted by other nodes in the network.

According to an aspect of the invention, discussed with reference to FIG. 1, a transmitter node A in a wireless network 82 sends a message, encoded in a series of frames whose structure will be discussed later on, to a receiver node B.

The receiver B may belong to the same wireless network 82 as A but, in general, is a generic node accessible by any kind of network connection. A possible scenario may be that A is a mobile sensor that sends periodical updates of its position, and possibly of other variables, to a server B in the internet or in a generic network 84. The transmission is disturbed by interferer I that transmits (arrows 35) on the same frequency as the transmitter node A. As mentioned in the introduction, I can belong to the wireless network 82, or to another communication network, possibly using a different modulation system whose frequency overlaps with that used by A.

The radio message is received (arrows 21) by nodes C, D, E, which preferably are part of the infrastructure of the wireless network 82. They may be base stations in the wireless network 82. The transmissions 21 are partially covered by I and the base stations may not succeed in decoding completely the message but, possibly, the messages they get are not corrupted in the same way.

The message 21 may use the structure of the conventional LoRa frames with a error correction scheme. This is described in the art, for example in EP2767847 (which is hereby incorporated by reference), and will be recalled only summarily here.

A special advantage of LoRa transmission is that it allows precise synchronization. This is instrumental in IoT networks in which the mobile nodes have low-cost oscillators and must remain as much as possible in low-power states. LoRa receivers can synchronise themselves to the time reference of the sender and track its drift, correcting the inherent errors of the transmitter's time reference.

The message transmitted by A is preferably a LoRa modulated signal that comprises a series of frequency chirps, which can be described by the time profile f(t) of their instantaneous frequency or also by the function $\phi(t)$ describing the phase as a function of the time. A message can include a plurality of different profiles, each corresponding to a symbol in a modulation alphabet.

Often, the modulation alphabet includes unmodulated chirps, also called base chirps, that have a specific and predetermined frequency profile, for example a linear ramp of frequency rising from a minimum to a maximum value, and modulated chirps obtained from base chirps by time-shifting cyclically the base profile.

The frequency of a base chirp may rise linearly from an initial value $f_0=-BW/2$ to a final value $f_1=BW/2$ where BW stands for the amount of bandwidth spreading, but descending chirps, or conjugate chirps are also possible. It is advantageous if the phase of the signal is continuous when crossing from a symbol to the following. This can be obtained by choosing a base profile that yield the same phase at the lower and upper limit $\phi(t_0)=\phi(t_1)$.

Figure 2:
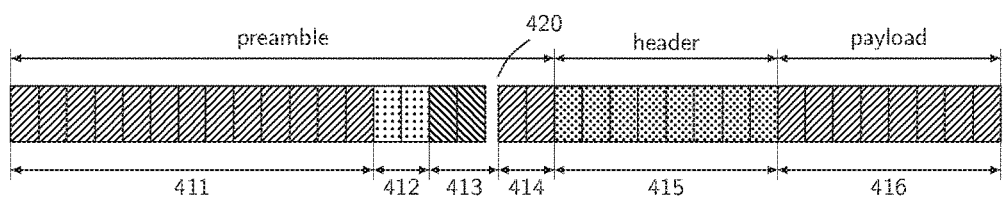
FIG. 2 represents schematically the structure of a frame according to an aspect of the present invention.

FIG. 2 represents schematically a possible structure of a frame in a LoRa-modulated message. Each rectangle represents a chirp, or a modulation symbol, and may correspond to one or several encoded bits. The frame starts with a preamble that includes a detection sequence 411 of base (unmodulated) symbols. The detect sequence is used in the receiver to detect the beginning of the signal and, preferably, perform a first synchronization of the receiver's time reference with the transmitter's one. A frequency shift can be obtained, for example, by "dechirping" the base symbols, that is: multiplying them by locally synthesized conjugate chirps, and applying a Fourier transform to the result.

The end of the detect sequence is marked by various symbols that are used in the receiver to improve the synchronization. These may include frame synchronization symbols 412 that are chirps modulated with stated predetermined values, frequency-synchronization symbols 413 that are complex conjugate of the base chirps and fine-synchronization symbols 414. The frame further comprises a header 415 that includes information to identify the following data, and a payload, of variable length that includes the message whose transmission was intended.

Importantly, the time-frequency duality of chirp signals is exploited in LoRa receivers to synchronise their time references to the transmitter's time base when detecting a preamble and when demodulating the payload, as explained in EP2767847. Typically, the receiver will continuously estimate and track a value of a frequency offset between its own time base and the transmitter's one, by a timing compensation loop.

The length of a frame is determined by the protocol specification with regard to the spreading factor. Table 1 provides an example of possible length of various blocks, in symbols.

The bandwidth of compensation loop plays an important role to the quality of reception, in relation with the length of the interferer's signal and of the LoRa symbols and frames. Since LoRa uses spreading, interferers are often shorter than frames, especially for high spreading factors.

It has been found that a narrow bandwidth fine timing compensation loop is often advantageous. By "narrow bandwidth" is intended a transfer function that attenuates or ignores impulses shorter than a typical LoRa frame. If the timing compensation loop's bandwidth is low, short interferences in the middle of the frame will not affect the timing compensation data and will not prevent the correct reception of the end of the frame when the disturbance has passed.

Fast (wide bandwidth) correction of time drifts may also be desirable in some cases, for example, when the transmitter temperature is changing fast due to self-heating, which in turn translates in increased drift of its crystal oscillator and in the frequency offset of the signal. A limitation of this approach is that the drift error can be determined in real time only when the signal is received and can be demodulated. When the reception is disrupted by an interference, the drift error is shortly lost, and the drift correction is not possible.

Preferably, the base stations C, D, E that receive the signals 21 are arranged to adapt the timing error compensation upon detection of an interference. For example, the base stations may implement two or more timing tracking loops, one with a fast dime drift correction, and one with a slower correction, or even a static, constant correction of the frequency with no tracking.

The receivers of the base stations C, D, E are preferably arranged to correct the drift by means of the fastest loop, in normal conditions, and fall back to the slower correction, or even to a static correction, abandoning all attempt to tracking, in the case of reception errors.

The base stations can detect reception errors by error correction codes, for example CRC codes inserted according to the chosen error correction scheme. Of course, if the CRC codes are incorrect, both when the signal is processed with a fast and a slow tracking, switching to the slow tracking will not restore the data that were lost to interference, but may help resuming correct reception once the interference has ended.

To implement several timing correction loops, the base station of the invention may have multiple receivers in parallel, with slow and fast timing correction loops, or multiple parallel hardware control units that have wide and narrow bandwidths. Since base station are not usually deployed in very large numbers, this hardware duplication is not a shortcoming. The invention also includes embodiments in which the control units that determine and track the timing error are implemented fully or in part in software, however.

Preferably, the frequency offset correction loop includes a frequency drift model, and/or a thermal drift model of the transmitter oscillator. These models are used to extrapolate a frequency drift and resume demodulation after the interference has ceased.

The error correction scheme divides the frame in blocks of few symbols, for example blocks of five to eight symbols, the number being variable according to the necessity and to the coding rate. These blocks are independently encoded. A single frame of 40 bytes, transmitted at Spreading factor SF10 may include eight or ten blocks, depending from the modulation set-up.

According to the presented example, the base stations E, F, G report all the valid packets that they receive, but also the invalid received ones, together with the CRC of the received frame.

A LoRa central server S gathers data and meta-data from all the base stations C, D, E. The server detects and possibly processes further invalid frames that correspond to the same transmission.

There are several possibilities to identify sets of received frames originating from the same transmitted frame. For example, the base stations could timestamp the received frames and add join this metadata to the information transmitted to the central server S. The timestamp, possibly in combination with an individual code identifying the transmitter node A, allows grouping together the frames that correspond to the same transmission.

In the fortunate eventuality that at least one of the frames corresponding to a transition has a valid CRC, this frame is considered as "correct", and sent forward to the designated recipient B (arrow 28).

LoRa frames are endowed with a header that encodes the coding rate and the side of the payload. Preferably, at least one of the received frames for a transmission should be received correctly by at least one base station, to simplify the following processing and increase the reliability of the result. In alternative, size and encoding rate may be determined or known in advance, or guessed.

Importantly, LoRa network are redundant, i.e. all base stations operate on the same frequency, which improves the effectiveness of the cooperation scheme of the invention.

Figure 3:
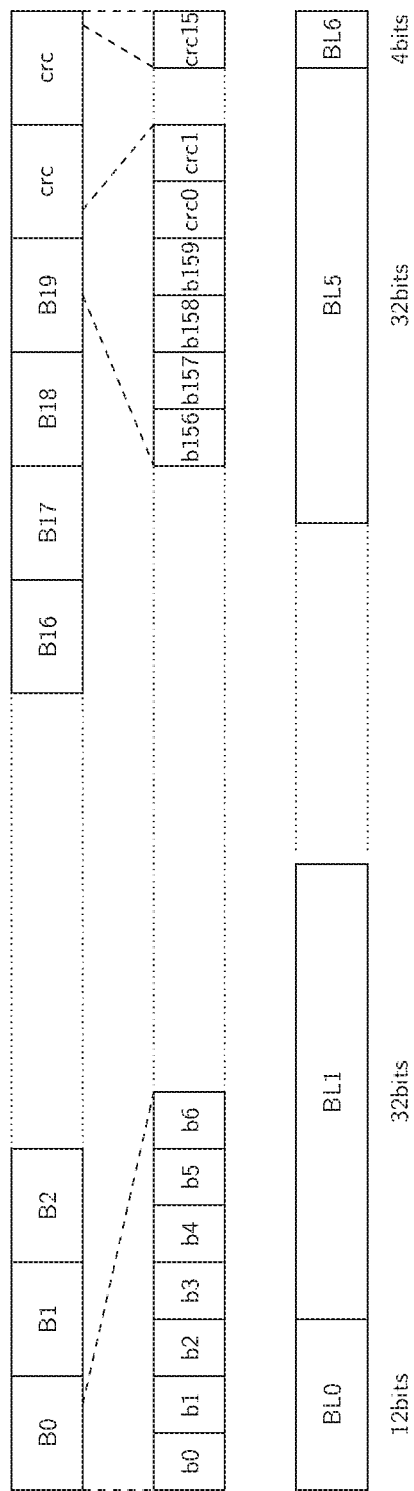
FIG. 3 shows, in a simplified manner, a possible division of a message in error correction blocks according to an aspect of the present invention.

To simplify the discussion, it will be assumed that a transmission set includes two frames received by two base stations (or by two antennas/radios in the same base station) that are identified as pertaining to the same transmission. The LoRa server S, upon reception of these frames, performs the following operations:
 cut each frame in blocks corresponding to the size of the error correction blocks. The size of the block may be predetermined and known to the server S, or otherwise derivable by the server S. For standard LoRa transmission and various spreading the size of the blocks is in fact predetermined depending on the spreading factor and other known variables, as given by table 1 below, but the numerical values are not an essential feature of the invention.
 The size of the blocks need not be the same in one frame: the first block may be special, because the first data bits may be transmitted together with the header, which is encoded in a specific way, and the last block may be smaller than the others. Typically, the last block includes the CRC value, i.e. the CRC is appended at the end of the data bits before the cut, but other positions are also possible. FIG. 3 illustrates an example of cut in the case of a standard LoRa transmission
 find corresponding blocks that are identical in all the frames in the set.
 for all blocks that are not identical in all the frames in the set, compose mixed frames by selecting one out of all the possible combinations, and check if they yield a CRC matching with the transmitted CRC.
 if the CRC is valid, then the correct message has been found and can be transmitted to the designated receiver B (arrow 29).

TABLE 1

Error Correction block sizes, in information bits

| | SF5 | SF6 | SF7 | SF8 | SF9 | SF10 | SF11 | SF12 |
|---|---|---|---|---|---|---|---|---|
| First block, FS = 0 implicit header | 12 | 16 | 20 | 24 | 28 | 32 | 36 | 40 |
| First block, FS = 1 implicit header | 20 | 24 | 28 | 32 | 36 | 40 | 44 | 48 |
| First block, FS = 0 header present | N/A | N/A | 0 | 4 | 8 | 12 | 16 | 20 |
| First block, FS = 1 header present | 0 | 4 | 8 | 12 | 16 | 20 | 24 | 28 |
| Next block, ppm_offset = 0 | 20 | 24 | 28 | 32 | 36 | 40 | 44 | 48 |
| Next block, ppm_offset = 1 | 12 | 16 | 20 | 24 | 28 | 32 | 36 | 40 |

Usually, the number of combinations to explore is manageable. In typical cases, one or two blocks will be interfered and at most four blocks will be different. This corresponds to a search space of $2^4=16$ combinations, of which 2, those who have been received, have already had their CRC checked in the base stations, and are known to be invalid.

Figure 4:
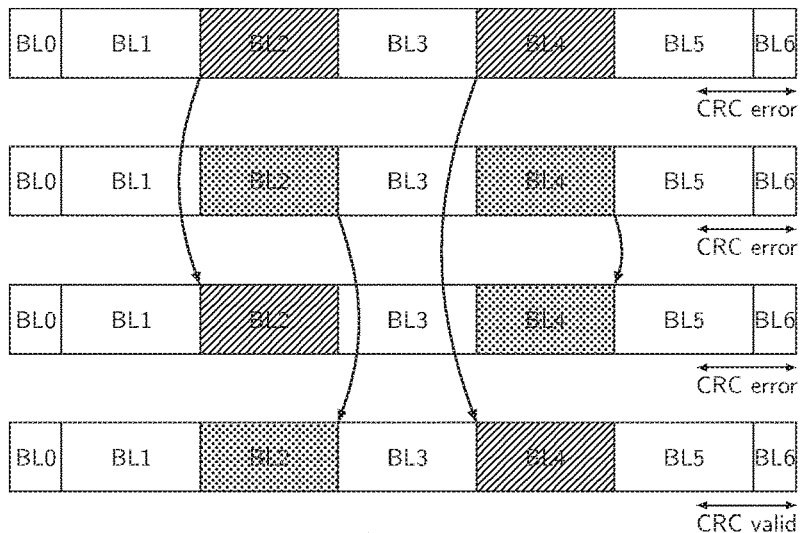
FIG. 4 illustrates schematically a method of comparing and combining diversity data according to an aspect of the present invention.

FIG. 4 represents graphically an example of combinatorial search of the valid combination with two corrupted blocks in two received signals.

If the set of received frames comprises more than two blocks, the search space can be simplified by applying a majority selection and accepting as valid those blocks that are represented in a majority of received frames. The combinatorial search described above is used for blocks that do not have a majority candidate.

Tests and simulations indicate that the error correction method of the invention does provide a significant improvement in the number of successfully transmitted frames, and a corresponding reduction in the number of retransmission requests. Following plots show the result of simulations under the following assumptions:
 all interferences have the same length, equivalent to a tenth of a frame, and their time-distribution is that of a Poisson process.
 a frame includes 20% header+preamble, and 80% data. For SF40, this corresponds to 40 byte of data.
 interferences occurring during the header or the preamble are not attempted to be recovered, and the corresponding frames are not forwarded.
 a frame cannot be recovered if all base stations suffer an interference in the same slot or block, otherwise the frame is recovered, or at least one base station receives a full valid frame.

Figure 5:
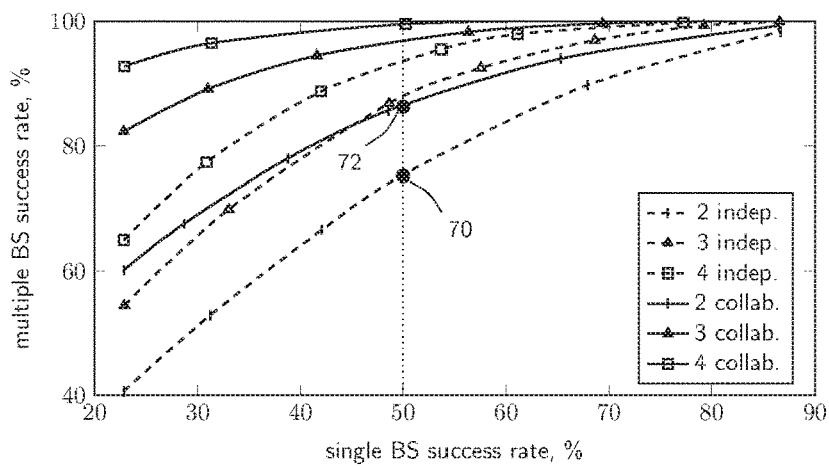
FIGS. 5 and 6 are plot of the success rate for the method of the invention.
Figure 6:
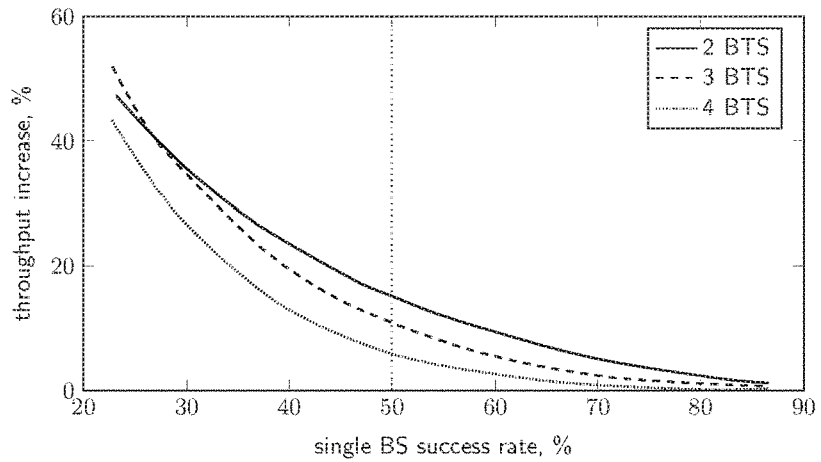

FIGS. 5 and 6 are plot of the success rate for the method of the invention as a function of the success rate for a single base station. If the success probability for one base station (without diversity) is 50%, then the probability of receiving one valid frame from two base stations is 75%. With the cooperative method described above, the success rate is increased to 86% (see points 70, 72), that is a 16% increase. For heavily interfered cases, the improvement can reach 50%. Importantly, this increase in success rate translates directly into a proportional increase of throughput and system capacity, as shown in FIG. 6.

The invention claimed is:

1. A wireless communication system, comprising one or several nodes equipped by a wireless radio interface that is adapted for transmitting to a recipient digital messages modulated in the form of a series of frequency chirps organized in frames of determined length and comprising error codes,
a plurality of base stations arranged for receiving and demodulating the digital messages,
a server arranged to receive the frames received from each base station and originating from the one or several nodes, the server being operatively arranged for dividing the frames received from the plurality of base stations in blocks, recombining a corrected frame comprising blocks received by diverse base stations, based on the error codes, transmitting the corrected frame to the recipient.

2. The communication system of claim 1, wherein each base station in the plurality of base stations is arranged for determining and tracking a timing error between a time reference of the one or several nodes and a time reference of the base station, and for compensating the timing error when demodulating the message originating from the node, the plurality of base stations being arranged for adapting the compensation of the timing error when the error codes indicate a corruption of the message.

3. The communication system of claim 2, wherein the plurality of base stations have a first control unit for the compensation of the timing error, and a second control unit for the compensation of the timing error, the second unit being less sensitive than the first unit to impulses that are essentially shorter than the duration of a frame, the adaptation of the compensation consisting in selecting the second control unit.

4. The communication system of claim 3, wherein the first control unit and/or the second control unit include a thermal drift model for the time reference of the one or several nodes.

5. The communication system of claim 3, wherein the second control unit applies a constant frequency offset correction.

6. The communication system of claim 1, wherein the plurality of base stations operate at the same frequency.

7. A wireless communication system, comprising one or several nodes equipped by a wireless radio interface that is adapted for transmitting to a recipient digital messages modulated in the form of a series of frequency chirps organized in frames of determined length and comprising error codes, a plurality of base stations arranged for receiving and demodulating the digital messages, a server arranged to receive the frames received from each base station and originating from the one or several nodes, the server being operatively arranged for dividing the frames received from the plurality of base stations in blocks, recombining a corrected frame comprising blocks received by diverse base stations, based on the error codes, transmitting the corrected frame to the recipient, wherein each base station in the plurality of base stations is arranged for determining and tracking a timing error between a time reference of the one or several nodes and a time reference of the base station, and for compensating the timing error when demodulating the message originating from the node, the plurality of base stations being arranged for adapting the compensation of the timing error when the error codes indicate a corruption of the message.

8. The communication system of claim 7, wherein the plurality of base stations have a first control unit for the compensation of the timing error, and a second control unit for the compensation of the timing error, the second unit being less sensitive than the first unit to impulses that are essentially shorter than the duration of a frame, the adaptation of the compensation consisting in selecting the second control unit.

9. The communication system of claim 8, wherein the first control unit and/or the second control unit include a thermal drift model for the time reference of the one or several nodes.

10. The communication system of claim 8, wherein the second control unit applies a constant frequency offset correction.

11. The communication system of claim 7, wherein the plurality of base stations operate at the same frequency.

* * * * *